United States Patent
Frager et al.

[11] 3,830,313
[45] Aug. 20, 1974

[54] FOLDING DISC HARROW

[75] Inventors: Glenn E. Frager; Bill J. Pfenninger, both of Hutchinson, Kans.

[73] Assignee: Krause Plow Corporation, Hutchinson, Kans.

[22] Filed: May 21, 1973

[21] Appl. No.: 361,985

[52] U.S. Cl.............. 172/581, 172/311, 172/456, 172/568, 172/662
[51] Int. Cl.. A01b 73/00, A01b 51/00, A01b 35/28
[58] Field of Search ........... 172/456, 581, 654, 662, 172/673, 776, 645, 649, 452, 454, 455, 457, 458, 568, 579, 580, 594, 595, 596, 310, 311, 629, 586, 640

[56] References Cited
UNITED STATES PATENTS

| | | | |
|---|---|---|---|
| 405,005 | 6/1889 | Booth | 172/662 X |
| 1,639,451 | 8/1927 | Cady | 172/581 |
| 2,098,116 | 11/1937 | Warne | 172/568 |
| 2,727,453 | 12/1955 | Altgelt et al. | 172/581 |
| 3,193,023 | 7/1965 | Adee | 172/581 X |
| 3,327,787 | 6/1967 | Adee | 172/456 X |
| 3,534,819 | 10/1970 | Grover | 172/473 X |
| 3,669,195 | 6/1972 | Green et al. | 172/568 |
| 3,730,280 | 5/1973 | Oelschlager | 172/581 |
| 3,731,747 | 5/1973 | Frank | 172/456 |

Primary Examiner—Robert E. Pulfrey
Assistant Examiner—Steven A. Bratlie
Attorney, Agent, or Firm—Schmidt, Johnson, Hovey & Williams

[57] ABSTRACT

A massive disc harrow, having wing sections which swing to upright positions for transport, has disc gangs which would normally extend substantially upwardly beyond the raised wing sections but for the ability of the gangs to be swung to substantially horizontal positions parallel to the path of travel of the harrow. When the wing sections are spread and the gangs are to be lowered, the rear of the harrow is swung toward the ground first until the rear gangs are grounded, whereupon the front of the harrow is swung downwardly about the fulcrum between the rear gangs and the ground in order to lower the front gangs. The process is reversed when the gangs are to be raised from the ground, with the front of the harrow lifting first, followed by the rear. A special articulated tongue facilitates such rocking action during raising and lowering.

3 Claims, 8 Drawing Figures

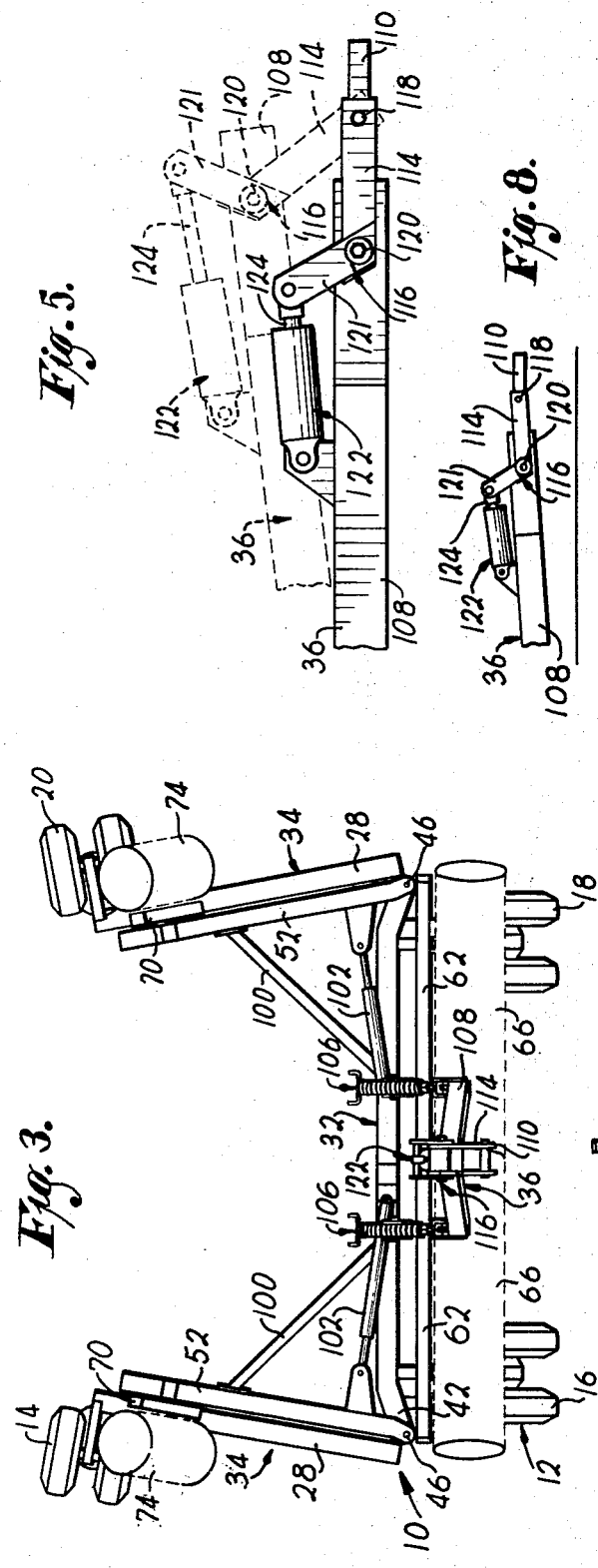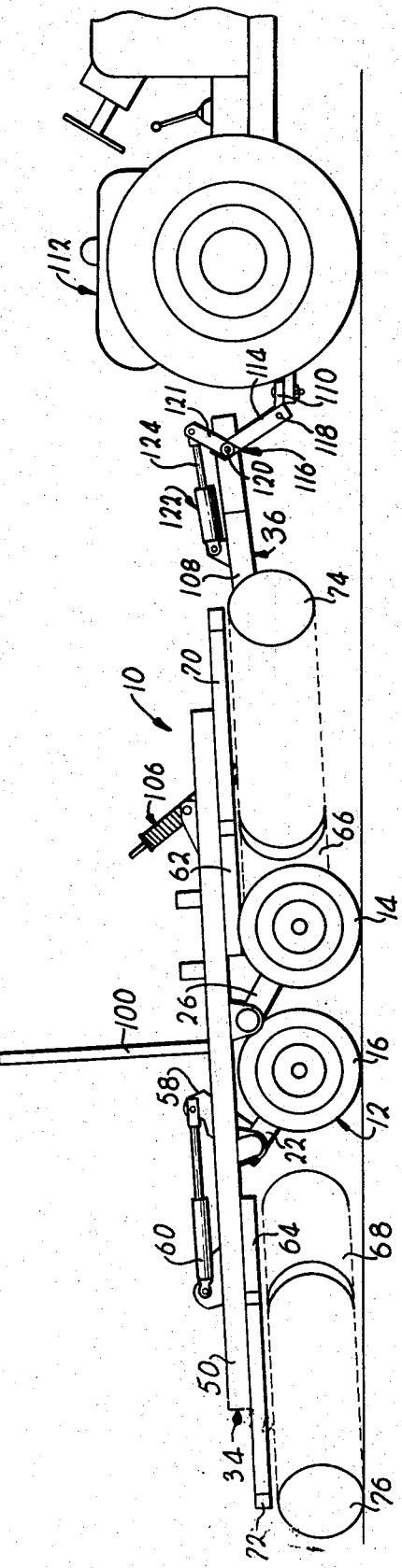

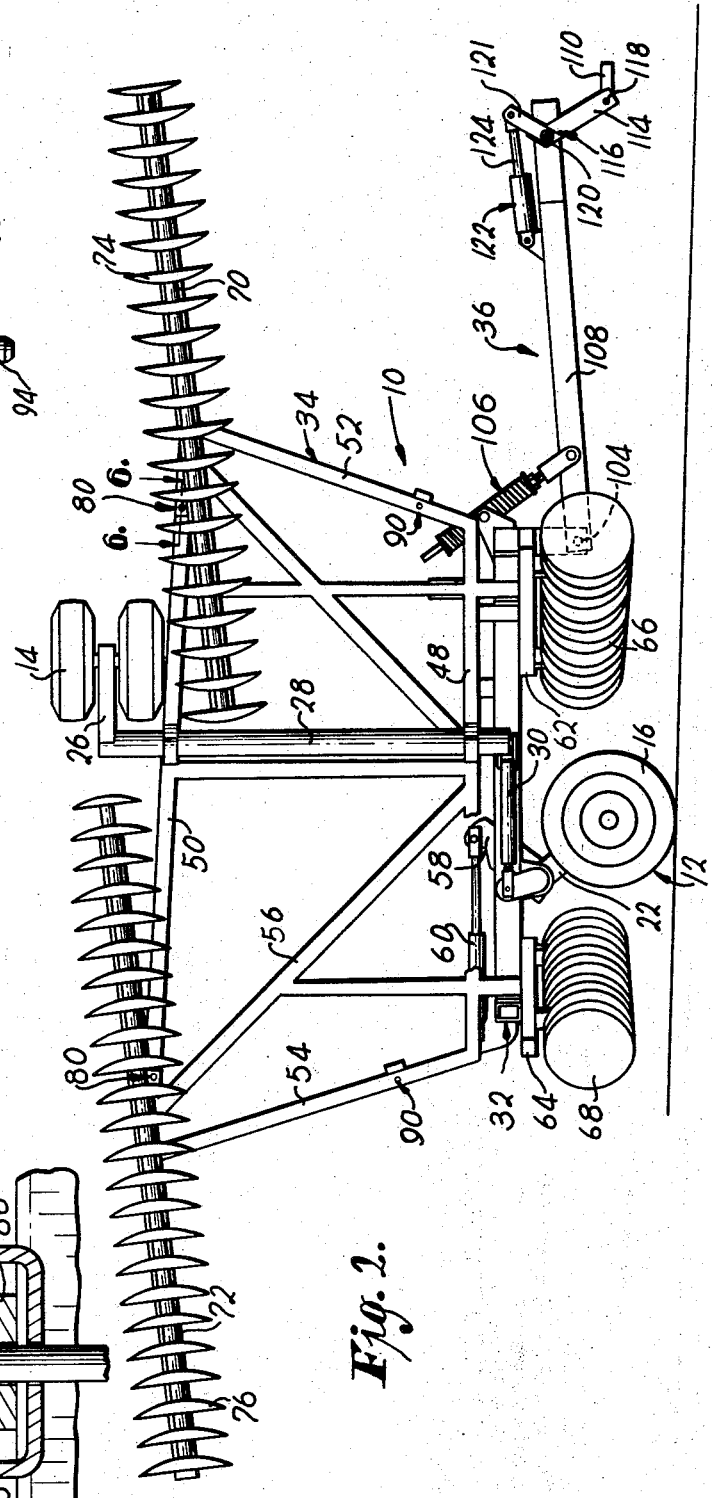

FOLDING DISC HARROW

This invention relates to massive, normally widespread ground-working implements, to compacting the same for transport to and from a work area, and to raising and lowering the tillage tools of the implement while the implement is in operation in a manner to avoid structural damage.

With the development in recent years of large, extremely powerful tractors and the like for pushing or towing ground-working implements, the need has arisen to develop larger and more massive implements which will most effectively utilize the capabilities of such tractors. Moreover, with the trend toward industrial type, large-scale farming methods as opposed to small, family-owned farms, it has become increasingly necessary to develop implements which will till the soil, cultivate the plants, and harvest the crops more rapidly and efficiently in order to economically justify such large-scale farming practices.

While, theoretically, implements could be constructed which were limited in size only by the availability of tractors to move the implements, certain serious problems are presented when implements of such massive proportions are used. For example, one very practical consideration is that the implement may be made too wide to pass through a gate or to be transported along the road between various work sites. In this latter respect, many states have strict dimensional limitations which must be adhered to when transporting implements and the like along various roads and highways throughout the state.

Accordingly, it has been the practice to acquire the necessary lateral compactness for passage through a gate or travel along the road by constructing the outer portions of the implement in a manner that will permit the same to be swung upwardly in the nature of wings when the implement is to be transported or stored. In this manner, the effective width of the implement can be substantially reduced.

However, such wing-like construction alone ignores the problems associated with excessive height of the implement. When the wings of the implement are swung to upright positions to reduce the width of the implement, they thereby add substantially to the height of the implement, hence increasing the likelihood that the implement will not clear overhead power lines, tree limbs, or overpasses while the implement is being transported.

Therefore, it is an important object of the present invention to provide a massive, relatively widespread implement in keeping with modern, large-scale farming trends which may be rendered sufficiently compact, both laterally and vertically, to permit transport.

Pursuant to the foregoing, another important object of the present invention is to provide an implement having wing sections swingable to upright positions for transport wherein gangs of tillage tools which would otherwise extend substantially upwardly beyond the raised wing sections can be swung to horizontal conditions in line with the path of travel of the implement so that not only is the width of the implement reduced by folding the wing sections, but the overall height is reduced as well.

An additional important object of this invention is to maximize the effectiveness of the folding capability of the implement for its particular size by hinging the wing sections to the center section of the implement at locations spaced substantially from the central draft line in accordance with the allowable width of the implement.

It will be recognized that another serious problem encountered when implements reach massive sizes is that of structural failings resulting from excessive loads being placed on certain portions of the implements not only during working of the tools of the implement, but during raising and lowering of the same to and from ground-working positions. For example, it is often the case that the tools must be raised rapidly when the end of a row has been reached in order to facilitate turning for advancement along the next adjacent row, and then must be just as rapidly lowered or dropped to the ground while the machine is moving in order to place the tools in readiness for performing their ground-working functions. In some instances, such dropping of the tools to the ground takes place before the turn has been fully completed, thus placing additional twisting and bending stresses on the tools over and above the shock stresses encountered by dropping of the tools. When the tools are mounted on long bar frames or the like supported in cantilever fashion by the chassis of the implement, it will be appreciated that the stresses placed on the bars and on the tools at the outermost ends thereof can be excessive when the situations above discussed are encountered.

These problems can be particularly acute where banks or gangs of tools are spaced apart fore-and-aft on the path of travel of the implement and are so designed that the front tools dig into the soil more deeply than the rear tools. For example, in a disc harrow the front gangs of discs may be oriented so that the concavities of the front discs face laterally outwardly to cause digging in, while the rear discs are positioned with their concavities facing laterally inwardly, hence tending to make them dig in less than the front discs. Manifestly, if the front discs were dropped to the ground abruptly during a high-speed turn and before engagement of the rear discs with the ground, substantial bending and shock loading would be placed upon the front discs, giving rise to mechanical failure.

Accordingly, an additional important object of the present invention is to provide means by which the tool-supporting chassis of an implement as above described may be rocked to the ground in a manner to engage one set of tools with the ground before another set of tools. In the case of a disc harrow, it is preferred that the rear set of discs be grounded before the front set thereof, thereby avoiding the stress problems above set forth.

Another important object is to provide a special articulated hitching tongue which facilitates the aforesaid rocking action of the chassis during the two-stage grounding of its tools.

A further important object of this invention is to provide for leveling of the implement frame when the latter has been raised for over-the-road travel in order to assure that one set of the tools thereof does not project precariously more closely to the ground than another.

In the drawings:

FIG. 2 is a side elevational view of the harrow in condition for over-the-road travel;

FIG. 3 is a front elevational view of the compacted harrow;

FIG. 4 is a side elevational view of the harrow attached to a towing tractor and illustrating the manner in which the rear gangs are lowered to the ground before the front gangs;

FIG. 5 is an enlarged, fragmentary elevational view of the articulated tongue of the harrow illustrating its operation;

FIG. 6 is an enlarged, fragmentary cross-sectional view taken along line 6—6 of FIG. 2 and illustrating the means for locking one of the disc gangs in its transport position;

FIG. 7 is an enlarged, fragmentary, cross-sectional view taken along line 7—7 of FIG. 1 and showing the locking means for holding one of the gangs in its normal, ground-working disposition; and FIG. 8 is a fragmentary, elevational view of the tongue of the harrow illustrating the fact that the tongue remains slightly inclined during operation of the harrow even when swung to its lowest position.

Figure 1:
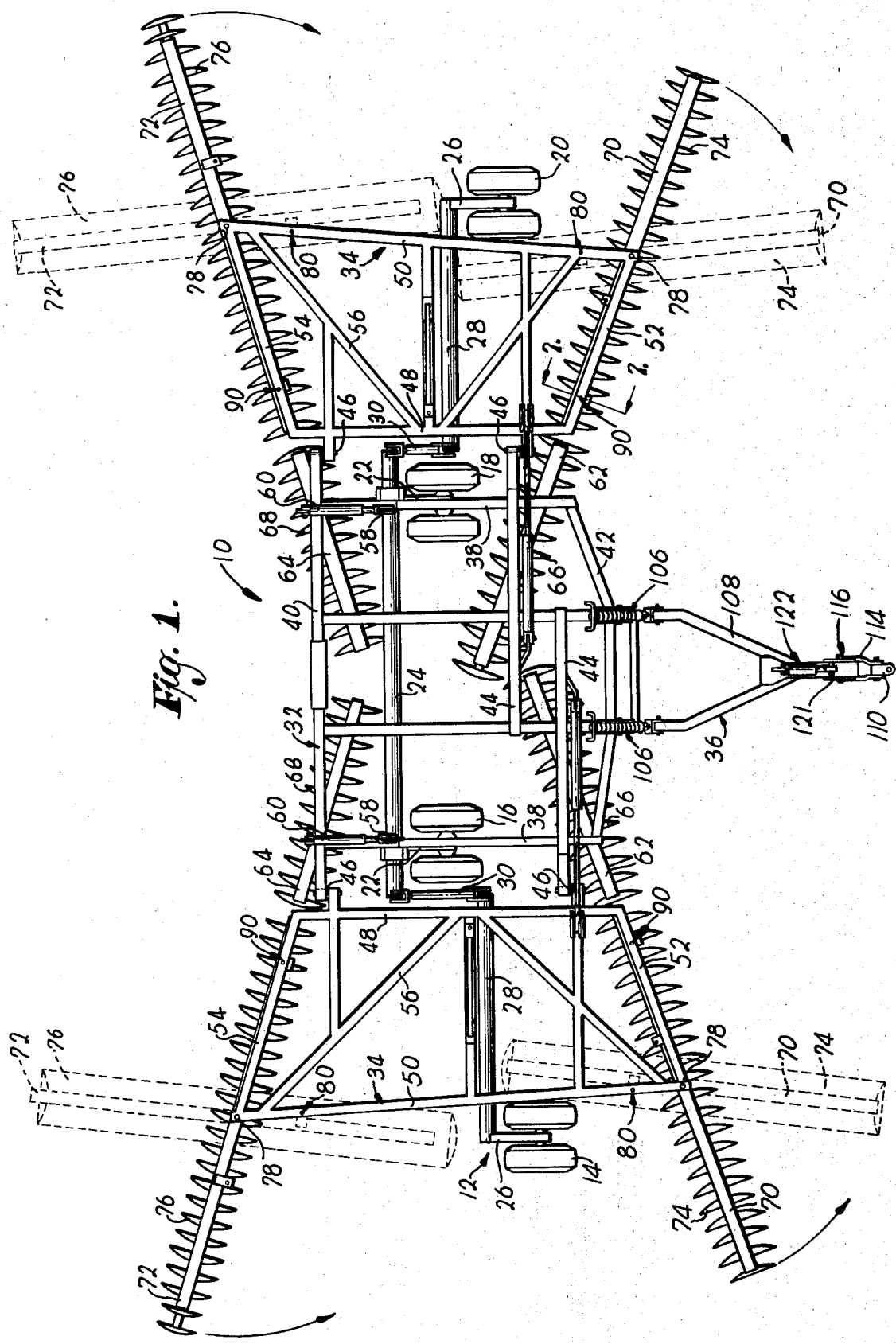
FIG. 1 is a top plan view of a disc harrow constructed in accordance with the teachings of the present invention with its wing sections spread, alternative transport positions of the outer disc gangs being indicated by dashed lines.

The implement 10 chosen for illustration is a disc harrow, but it will be appreciated that the principles of the instant invention are not limited to an implement of this specific character and may be applied equally as well to implements using tools other than discs. The harrow 10 has a ground-engaging support assembly denoted broadly by the numeral 12 which includes four sets of dual wheels 14, 16, 18 and 20. The wheels 16 and 18 are mounted by arms 22 on a common shaft 24 extending transversely to the path of travel of harrow 10, while the wheels 14 and 20 are mounted by arms 26 on separate transversely extending shafts 28 disposed forwardly of shaft 24. Universal type drive couplings 30 operably connect opposite ends of shaft 24 with adjacent ends of the shafts 28.

The support assembly 12 carries a chassis consisting of a central section 32, tow wing sections 34 which project outwardly from opposite lateral sides of central section 32, and a draft section or tongue 36 projecting forwardly from central section 32. The central section 32 is polygonal having a pair of fore-and-aft inner side beams 38 tied together at the rear by a cross beam 40 and at the front by a front cross beam 42. A pair of bracing beams 44 project laterally from central section 32 at opposite directions near the front cross beam 42 and, in conjunction with the rear cross beam 40, carry hinges 46 for the wing sections 34, adapting the latter for vertical swinging about horizontal axes aligned with the path of travel of harrow 10 and spaced on opposite sides of the line of draft thereof defined by tongue 36.

The wing sections 34 also are polygonal, being generally trapezoidal in configuration, with inner side beams 48 extending in general parallelism with the proximal side beams 38 of center section 32, outer side beams 50 which converge slightly as the front of harrow 10 is approached, and front and rear beams 52 and 54 respectively extending between side beams 48 and 50 and converging as inner side beams 48 are approached. Sufficient angularly extending bracings, such as 56, are provided to render the wings 34 sturdy. The hinges 46 and the couplings 30 have their axes coincident with one another so that wings 34 may be raised and lowered without any binding.

The shaft 24 is journaled for rotation relative to central section 32 and has a pair of longitudinally spaced cranks 58 which are actuated by fluid pressure piston and cylinder units 60 on section 32 to effect shifting of the latter toward and away from the ground when pressurized fluid is introduced and released from units 60. Similarly, the shafts 28 for wheels 14 and 20 are rotatably journaled by wing sections 34 whereby power transmitted to shafts 28 via couplings 30 causes the wheels 14 and 20 to be actuated simultaneously with the inner wheels 16 and 18. Accordingly, the sections 32 and 34 of the chassis are raised or lowered in unison in response to actuation of units 60.

The center section 32 has a pair of front, primary gang frames 62 rigidly fixed beneath section 32 and extending obliquely to the normal path of travel of harrow 10, and a pair of rear primary frames 64 that are also rigidly affixed to the bottom of section 32 and extend obliquely to the path of travel of harrow 10. Each front primary frame 62 carries a gang of discs 66 which have their concavities facing laterally outwardly, while each rear primary frame 64 carries a gang of discs 68 having their concavities facing laterally inwardly.

Each of the wing sections 34 carries a long, front secondary disc frame 70 which normally extends in end-to-end alignment with the corresponding primary frame 62 and projects substantially outwardly beyond the corresponding outer side beam 50. Similarly, each wing section 34 also includes a long, rear secondary frame 72 extending substantially outwardly beyond outer side beam 50 and normally in end-to-end alignment with the corresponding inner primary frame 64. The front secondary frames 70 suspend therefrom gangs of discs 74 having their concavities facing laterally outwardly, while the rear secondary frames 72 suspend therefrom gangs 76 of discs having their concavities facing laterally inwardly.

The secondary frames 70 and 72 are suspended beneath their wing sections 34 by vertical pivots 78 located at the outer corners of the sections 34. The pivots 78 thus adapt the frames 70, 72 and their associated gangs 74, 76 for swinging between the widespread, solid line working positions of FIG. 1 and the broken line transport positions of FIG. 1 wherein the frames 70, 72 on each side of harrow 10 are substantially in alignment with one another and with the path of travel of harrow 10. As detailed in FIG. 6, each wing section 34 has a pair of locking pin units 80 associated with the outer side beam 50 for holding the front and rear secondary frames 70, 72 in their transport positions. Each locking unit 80 includes a long pin 82 having a handle 84 across the top end thereof, the pin 82 being removably received by the tubular beam 50 and projecting through the latter into holding relationship with an ear 86 that slips into a U-shaped loop 88 depending from beam 50. In addition, each wing section 34 is also provided with a second pair of locking units 90 (FIG. 7) on each of the front and rear beams 52 and 54 for releasably holding the frames 70, 72 in their normal working positions. Each unit 90 is similar to the units 80, having a handle 92 and a long pin 94 which extends completely through the corresponding beam 52 or 54 and through the corresponding frame 70 or 72. The frames 70 and 72 are received between a pair of vertically spaced flanges 96 rigidly secured below the respective beams 52 and 54 by upright pieces 98.

As shown best in FIGS. 3 and 4, a pair of struts 100 project upwardly at an angle from center section 32 and in opposite directions for holding the wing sections 34 in their upright, folded transport positions. Each strut 100 is provided with means (not shown) at the outermost tip end thereof for releasable attachment to the corresponding wing section 34. A pair of laterally extending, fluid pressure piston and cylinder units 102 on center section 32 adjacent the front thereof are coupled with the wing sections 34 for swinging the latter between their widespread and transport positions.

The draft section or tongue 36 of harrow 10 is secured to the center section 32 by horizontal pivots 104 (FIG. 2) and is biased downwardly away from center section 32 by a pair of weight transfer devices 106 in the nature of adjustable coil springs. The tongue 36 is of a special articulated nature so as to permit the rocking action of chassis 10 that occurs when the harrow 10 is raised and lowered between its ground-working and idle positions. In this respect, the tongue 36 includes a main yoke piece 108 which extends forwardly from the pivots 104, a connector piece 110 which is adapted to couple directly to a towing vehicle 112 (FIG. 4), and a medial piece 114 interconnecting pieces 108 and 110 and forming one leg of a bell crank 116. Details of the tongue 36 adjacent its forward end are shown best in FIG. 5, wherein it may be seen that the medial piece 114 is connected by virtue of a pivot 118 at one end to connector piece 110 and by a second pivot 120 at the opposite end to the yoke piece 108. The pivot 120 also serves as the axis of rotation for the bell crank 116, and the other arm 120 of the latter projects angularly away from the medial piece 114 at pivot 120. A fluid pressure piston and cylinder unit 122 having a ram 124 interconnects the free end of crank arm 120 with yoke piece 108 to control the articulation of pieces 108, 110 and 114 about the pivots 118 and 120.

The fluid pressure piston and cylinder units 40, which control the raising and lowering of the chassis, and the unit 122 which controls tongue 36 are connected in parallel flow relationship with each other and with a source of pressurized fluid associated with the vehicle 112. The units 40 and 122 are of substantially equal capacities. On the other hand, the units 102 which control vertical swinging of wing sections 34 are operated by a different flow network from that associated with the units 40 and 122 so that operation of units 102 does not affect the units 40 and 122.

OPERATION

When the harrow 10 is in operation the wing sections 34 extend laterally outwardly from center section 32 in a generally horizontal condition with the gangs 66, 68 and 74, 76 engaging the ground. Normally, the wheels 14-20 will only lightly ride over the ground at this time, or they may be raised to such an extent that they completely clear the ground, the harrow 10 then being supported solely by the gangs 66, 68 and 74, 76. The gangs 74 and 76 will be locked in their laterally extending positions by the locking units 90 so that a wide swath can be taken across the field when harrow 10 is advanced by the tractor 112.

When tillage work has been completed, the harrow 10 may be prepared for over-the-road travel by raising the chassis through piston and cylinder units 40 and 122 so that the gangs 66, 68 and 74, 76 clear the ground. It will be understood that although wheels 14-20 support the majority of the load, a certain amount of weight is also distributed to the tongue 36 at this time. The locking pins 94 may then be removed and the gangs 74 and 76 swung in the direction of the arrows of FIG. 1 to their transporting positions in line with the path of travel of harrow 10. Once so arranged, the gangs 74 and 76 may be locked in such transporting positions by locking units 80 to preclude accidental swinging of the gangs 74 and 76 back to their working positions. In practice, each set of locking units 80 and 90 may utilize but a single locking pin usable alternatively in either unit, depending upon the positions of the gangs 74 and 76.

The units 102 may then be actuated to draw the wing sections 34 to their upright dispositions as illustrated in FIGS. 2 and 3 whereupon the struts 100 may be secured to wing sections 34. The harrow 10 is thereby readied for over-the-road travel, subject only perhaps to leveling of the same by actuation of the tongue piston and cylinder unit 122 as required. With the wing sections 34 thus raised and the swingable gangs of discs 74, 76 extending generally longitudinally of the path of travel of the harrow 10, the harrow 10 thus presents substantially reduced height and width portions for interference with gates and overhead structures. The ability to fold in the wings 34 results in harrow 10 being less than half as wide with the wings 34 spread, while the ability of the discs gangs 74-76 to be swung into horizontal alignment with the path of travel of harrow 10 enables harrow 10 to be reduced in height by more than one third of that if the gangs 74, 76 were not so swingable.

In order to maximize the effectiveness of the compacting ability of harrow 10, the center section 32 should be made as wide as that practicably possible, considering the dimensions of gates and the like through which harrow 10 must pass and state and local requirements, thereby maintaining the structure projecting above section 32 to a minimum when harrow 10 is ready for over-the-road travel. In this respect, note that if the wing sections 34 were hinged along the central draft line of harrow 10 rather than spaced substantially laterally therefrom as contemplated by the present invention, the height of harrow 10 when wings 34 are folded would be quite excessive, even though swinging of the gangs 74, 76 to their horizontal conditions would help substantially. In this situation, the width of harrow 10 when folded is reduced to an unnecessary extreme to the sacrifice of vertical compactness. Thus, while such a folded implement could pass with ease through gates and the like, interference with overhead tree limbs, power lines and overpasses would be likely. The desirability of hinging wing sections 34 at locations spaced laterally from the central draft line is therefore evident.

Preparation of harrow 10 for field work is just as easily carried out by simply reversing the above process wherein struts 100 are released, wings 34 are lowered by units 102, the gangs 74, 76 are swung outwardly after releasing the lock units 80, the pin units 90 are locked, and the chassis is lowered so as to properly lower all gangs 66, 68 and 74, 76 to the ground. It is during this lowering process, at initial preparation and during operation, that the special articulated nature of tongue 36 enables the disc gangs 66, 68 and 74, 76 to be lowered without structural damage, in spite of the massive proportions of harrow 10. Because of the fact that the front discs 66 and 74 have their concavities facing laterally outwardly, they will tend to dig more deeply into the soil than the rear discs 68 and 76. Accordingly, especially when high speed turns are being made, it is most desirable that the front discs 66, 74 be brought to the ground only after the rear discs 68, 76 have first been grounded. A reversal would mean that front discs 66, 74 would bear a large portion of the initial loading and dig deeply into the ground before the turn is completed, hence twisting and bending so as to not only damage the discs themselves but also the structure with which they are connected.

It will be appreciated that when the harrow 10 is in the condition of FIG. 2, but with wings 34 extended, substantially more loading is exerted on the rear piston and cylinder units 60 than on the tongue unit 122. Hence, because units 60 and 122 are coupled in parallel, and because they are of substantially the same fluid capacities, fluid will be discharged first from rear units 60 when fluid pressure in the system is released, followed only by discharging of fluid from unit 122 when the loading on units 60 and 122 has become substantially equalized. Such equalization occurs only when the load is taken from support assembly 12 and placed instead upon the rear gangs 68, 76. This condition is illustrated in FIG. 4, wherein rear gangs 68, 76 have engaged the ground and are thus receiving a load transfer from support assembly 12 such that fluid may then begin to discharge from unit 122. Once fluid does begin to discharge from unit 122, the front end of the chassis swings downwardly as the rear gangs 68, 76 form a fulcrum with the ground so that the front gangs 66, 74 become grounded.

The role of tongue 36 in this process may be most clearly seen by referring to FIGS. 2, 4 and 5. In FIG. 2 the ram 124 of unit 122 is fully extended with the tongue pieces 108, 110 and 114 projecting angularly from one another. As fluid then discharges from the rear units 60 to lower the rear of the chassis, the entire chassis pivots about pivot 120 to the position of FIG. 4, assuming that a slight extension of ram 124 can take place at this time. If ram 124 is fully extended such that no further travel thereof can occur during the time that the rear of the chassis is rocked to the ground, then the entire chassis must swing about pivot 118. In either case, the connector piece 110 remains stationary due to its connection with vehicle 112.

AS the rear of the chassis reaches its final lowered position and the pressure in units 60 and 122 become equalized, the front of the chassis rocks downwardly in the opposite direction as the tongue pieces 108, 110 and 114 articulate about pivots 118 and 120 until becoming substantially in end-to-end alignment with one another as shown in solid lines in FIG. 5 and also in FIG. 8. Thus, the rocking action of the harrow chassis is two-stage, with the chassis swinging downwardly first about either pivot 118 or 120 at the front of harrow 10, and then swinging downwardly in the opposite direction about an axis defined by the rear gangs 68, 76 as they form a fulcrum with the ground. FIG. 8 shows that even though the tongue pieces 108, 110 and 114 are in essentially straight line relationship with one another when the front discs 66, 74 are grounded, tongue 36 remains at a slight incline rather than in a true horizontal condition as illustrated in FIG. 5.

The articulation of tongue 36 has allows the forwardmost end of the harrow chassis to be lowered after the rearmost end thereof has been grounded. If tongue 36 were but a single rigid piece, it will be appreciated that tongue 36 could not itself be lowered. Any downward swinging of the front discs 66, 74 could thus only be carried out through the pivotal connections 104 of tongue 36 with central chassis section 32, and such is Because because only the spring devices 106 are provided for control at this junction.

Once all gangs 66, 68 and 74, 76 are grounded, the harrow 10 may be drawn along a row or swath until the end of the row is approached, whereupon it becomes necessary to raise all gangs 66, 68 and 74, 76 in order to make a high speed turn. For this procedure the front gangs 66, 74 are lifted first, followed by the rear gangs 68, 76 in a reversal of the earlier described lowering process. Becasue the loading on piston and cylinder unit 122 is considerably less than that on the rear units 60, pressurized fluid causes the front of harrow 10 to be lifted first, lifting tongue 36 as its pieces 108, 110 and 114 articulate. When the resistance to further extension of ram 124 becomes equal to or greater than the resistance to extention of the rams of the rear units 60, the rear of the chassis will begin to rise, swinging about the pivots 118 and/or 120 at the forward end of the chassis to elevate the rear gangs 68, 76. The turn may then be completed, and the chassis then lowered sequentially as earlier described in order to place the gangs 66, 68 and 74, 76 again in proper ground-working dispositions.

During the period that the rear of the chassis is rocked to the ground, a certain amount of weight transfer from the center chassis section 32 to the tongue 36 takes place by virtue of the spring devices 106. In this respect note that in the absence of devices 106 the tongue 36 would be free to swing about pivots 104 when weight is applied to the rear of tongue 36. However, by biasing tongue 36 downwardly at a point ahead of its pivotal connections 104, swinging is substantially precluded, and instead, weight is transferred from center chassis section 32 onto tongue 36 for ultimate transmission to the tractor 112. Thus, all of the weight of the harrow 10 is not borne solely by the rear gangs 68, 76 during the initial lowering stages.

The articulated tongue 36, in addition to permitting the special rocking action of the harrow chassis during raising and lowering thereof, also permits the chassis to be leveled once harrow 10 is in its roading condition as illustrated in FIG. 2 wherein all gangs 66, 68 and 74, 76 are clearing the ground. With harrow 10 in this condition, articulation of the tongue pieces 108, 110 and 114 in response to releasing fluid from or charging fluid into tongue unit 122 causes the chassis to swing about support assembly 12 as the latter forms a fulcrum with the ground. Hence, should the rear gangs 68, 76, for example, project more closely to the ground than the front gangs 66, 74, release of some fluid from unit 122 causes the front of yoke piece 108 to swing downwardly, hence raising the rear of the chassis. The above presupposes, of course, that the rear units 60 are maintained against actuation during the time that unit 122 is operated to level harrow 10.

Having thus described the invention, what is claimed as new and desired to be secured by Letters Patent is:

1. In a tillage implement:
a chassis including:

a polygonal, wheeled center section having a pair of elongated, fore-and-aft, outer side beams spaced laterally of the medial draft line thereof, a draft section pivotally connected to the center section thereahead on said draft line for relative vertical movement of the sections as the implement traverses uneven terrain, and a polygonal, wheeled wing section normally disposed outwardly of each outer side beam respectively and having an elongated, fore-and-aft, inner side beam extending along the proximal outer side beam, an outermost, fore-and-aft side beam spaced outwardly from said inner side beam, and a pair of transversely extending, fore-and-aft spaced, front and rear beams extending between said inner and said outermost side beams, said front and rear beams forming corners with said inner and outermost side beams and terminating at said corners;

front and rear hinges between each inner and outer side beam mounting the wing section on the center section for up and down swinging movements of the wing sections relative to the center section as the implement traverses uneven terrain;

a pair of elongated front and a pair of elongated, rear, primary frames suspended from said center section and disposed obliquely to said draft line;

an elongated front and an elongated rear secondary frame normally disposed beneath said front and rear beams of each wing section respectively, each normally extending laterally beyond its wing section, and each being normally disposed obliquely to said draft line in end-to-end alignment with a corresponding primary frame;

normally upright, fixed pivot means intermediate the ends of each secondary frame respectively swingably suspending the secondary frames below and from the front and rear, outermost corners of the wing sections;

a pair of first releasable locks between said secondary frames and said front and rear beams on each wing section for holding the secondary frames in said oblique positions;

a gang of tillage tools extending longitudinally of and suspended from each frame respectively;

power means interconnecting the center section and each wing section respectively for raising the latter about said hinges to a position extending upwardly from said outer side beams, said secondary frames being swingable about said pivot means to a position substantially parallel with said draft line, below and along said outermost side beams, upon release of said first locks whereby the secondary frames and their gangs of tillage tools are essentially horizontal when the wing sections are raised by said power means; and a pair of second releasable locks between said secondary frames and said outermost side beam of each wing section for holding the secondary frames against swinging movement about said pivot means and in said essentially horizontal position when the wing sections are in said raised position.

2. In an implement as claimed in claim 1, wherein said secondary frames of each wing section are disposed in substantially end-to-end alignment with one another when in said horizontal position.

3. In an implement as claimed in claim 1, wherein said chassis is provided with first and second, fluid pressure, parallel-connected power means for swinging the chassis successively and in opposite directions about horizontal axes at the front and rear of the chassis for lowering the rear gangs of tools to the ground before the front gangs.

* * * * *